May 21, 1940.    W. H. STILWELL    2,201,507
LINE WIRE JUNCTION BOX
Filed March 23, 1938    2 Sheets-Sheet 1

Inventor
W.H.Stilwell,
By D.P.Wolhaupter
Attorney

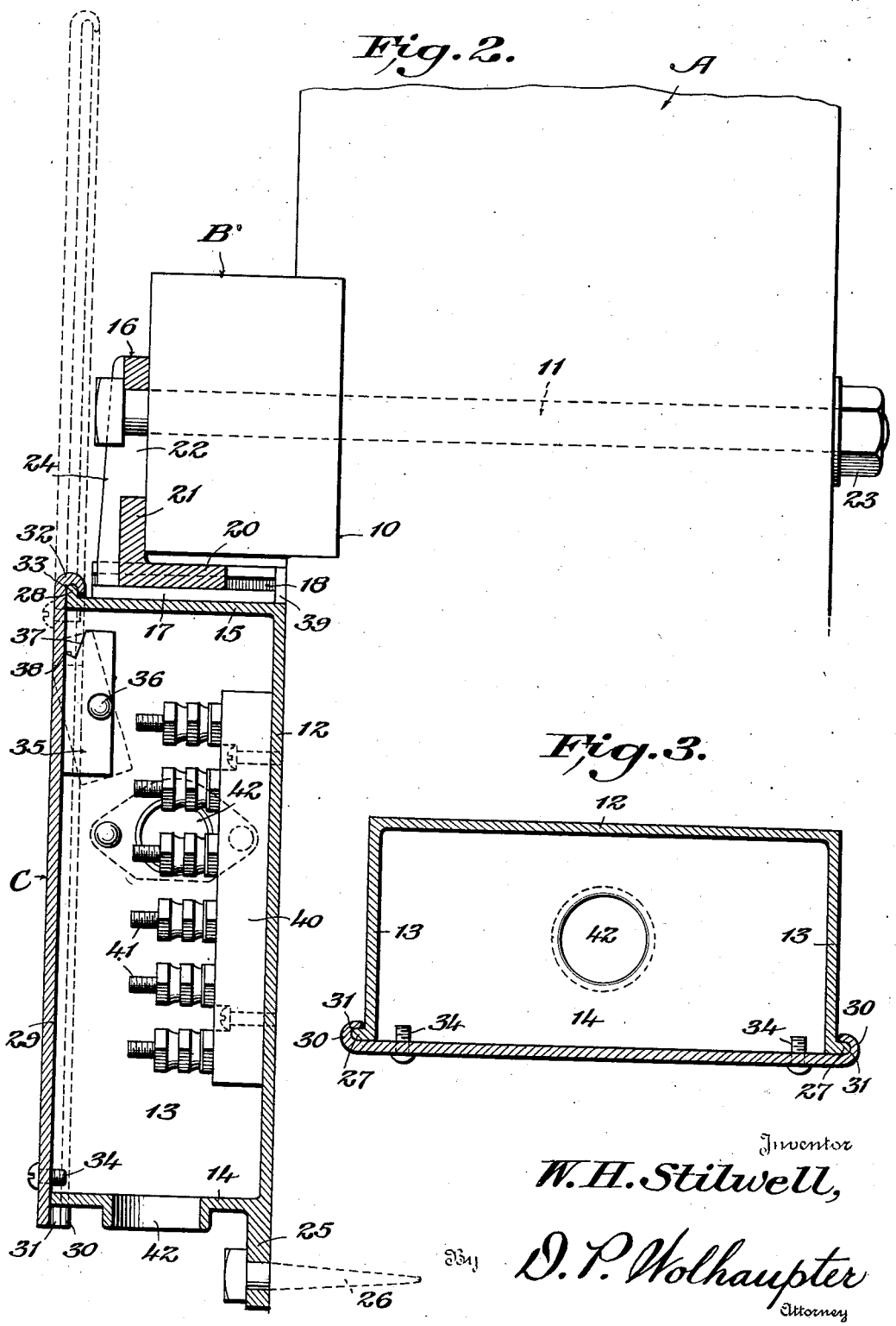

Patented May 21, 1940

2,201,507

UNITED STATES PATENT OFFICE 2,201,507

LINE WIRE JUNCTION BOX

Wilson Heath Stilwell, Louisville, Ky.

Application March 23, 1938, Serial No. 197,718

3 Claims. (Cl. 220—3.9)

This invention relates to line wire junction boxes, and has generally in view to provide an improved door and an improved mounting means for such boxes.

Line wire junction boxes commonly are used on telegraph, telephone, power line and other line wire poles to house insulating terminal posts and associated line wire terminals, and their use is quite advantageous for various well known reasons.

In mounting a line wire junction box on a pole it is desirable to utilize the bolt which ordinarily is employed to fasten a cross arm to the pole as a fastening or supporting means for the junction box, and it is also desirable that the junction box, in its mounted position, be disposed with its rear face against the pole so that the pole serves as a firm support for the box. If the fronts of cross arms were uniformly spaced from poles the problem of utilizing cross arm fastening bolts to secure junction boxes against poles would be greatly simplified, as all that would be required under such conditions would be an upstanding lug at the top of the box spaced the same distance forwardly from the rear face of the box as the fronts of the cross arms from the poles so as to overlie the front of a cross arm and engage the cross arm securing bolt when the rear face of the box was engaged with the pole. However, the spacing of the fronts of cross arms from poles is not uniform. Therefore, if, in accordance with prior practice, a fixed lug is provided at the top of a junction box to overlie a cross arm and to engage its securing bolt, mounting of the box so that it is firmly supported by the post usually requires either the placing of shims between the rear face of the box and the post, or the use of washers on the cross arm securing bolt between the lug and the front face of the cross arm, depending upon whether the spacing of the front face of the cross arm from the post is greater or lesser than the spacing of the lug from the rear face of the box. In either case, mounting of the box is a more or less laborious and time consuming operation. Accordingly, a special object of the present invention is to provide a junction box having a lug to engage a cross arm securing bolt, which lug is adjustable forwardly and rearwardly relative to the box so that it may be disposed against the front face of a cross arm and in operative engagement with the cross arm securing bolt when the rear face of the box is disposed against the pole, regardless of the spacing of the front face of the cross arm from the pole. Thus, mounting of the present box is greatly facilitated.

Another special object of the invention is to provide a junction box having a vertically slidable door which normally is held by its own weight in a lowered, closed position, which may readily be slid upwardly to open position, and which, when open, is disposed in an out of the way position and is held securely against sliding downward to its closed position or against any other movement, by wind or any other cause, until it is deliberately released and permitted to drop to its closed position. Thus, a workman's attention is not distracted by movement of the door when it is open and both of his hands are free and unimpeded by the door for use in connection with whatever work he may be engaged upon in connection with the box.

With the foregoing and other objects in view, the invention consists in a junction box embodying the novel features of construction, combination and arrangement of parts as will be hereinafter more fully described, illustrated in the accompanying drawings and defined in the appended claims.

In the accompanying drawings, wherein like characters of reference denote corresponding parts in the different views:

Figure 2 is a central, transverse section through the box showing the same mounted on a line wire pole and illustrating the door of the box in closed and open positions by full and dotted lines, respectively; and Figure 3 is a horizontal section through the box.

Figure 1:
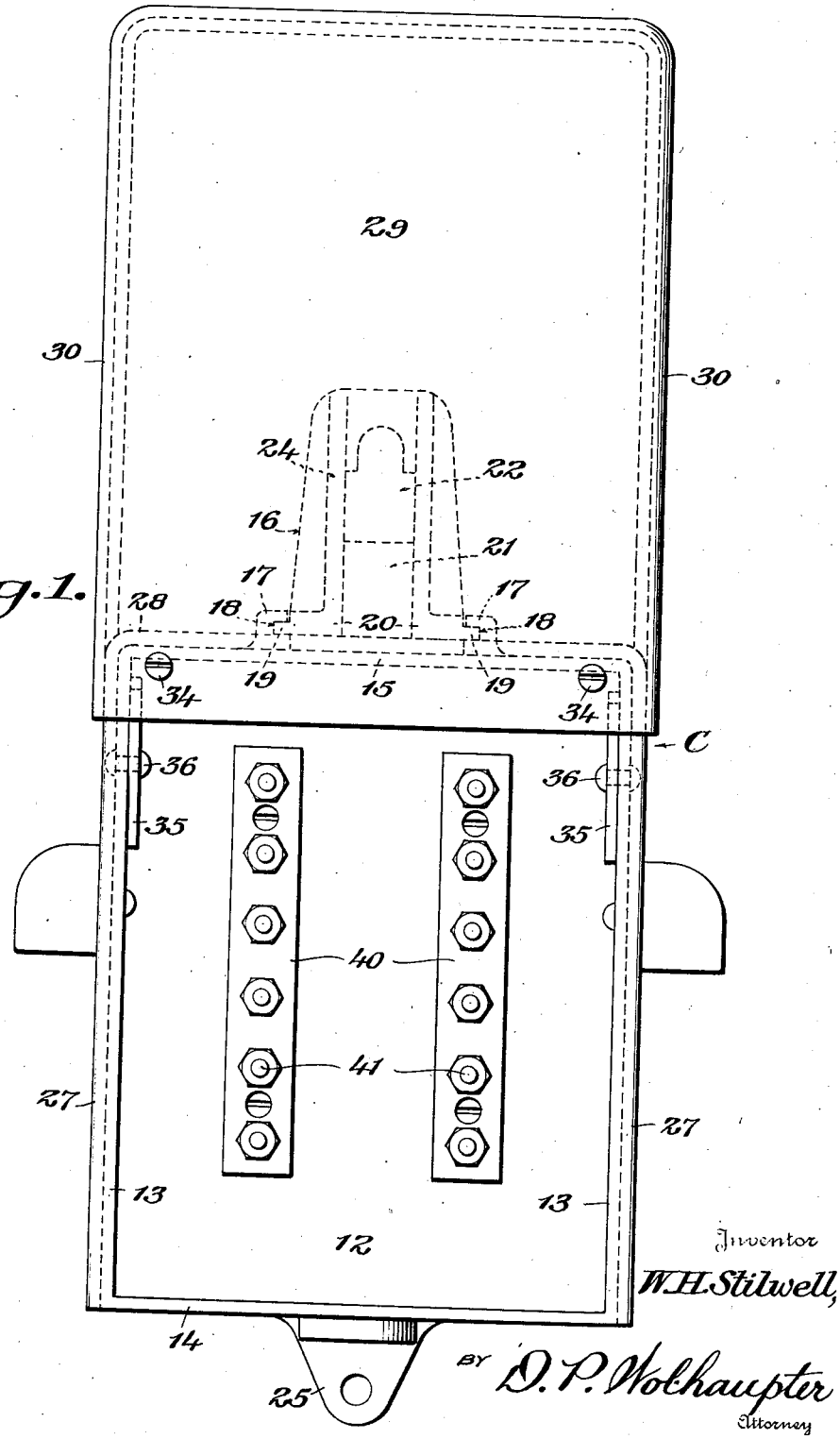
Figure 1 is a front elevation of a junction box constructed in accordance with the invention, the door of said box being shown in open position.

Referring to the drawings in detail, A designates a line wire pole, B designates a cross arm fastened in a mortice or "gain" 10 of said pole by bolt 11, and C designates, generally the present junction box suspended from the bolt 11 and seated at its back against the pole B whereby it is firmly supported.

Cross arms such as the arm B vary in thickness and pole mortices or "gains," such as the mortice or "gain" 10 vary in depth. Consequently, there is a lack of uniformity in the spacing of the front faces of cross arms from poles.

The present junction box, which may be cast or otherwise formed from iron or other suitable material, and which may be of any desired size and shape, is of boxlike construction, open at its front, or provided in its front with a suitable doorway, and comprises a rear wall 12, side walls 13, 13, a bottom wall 14 and a top wall 15.

In accordance with the invention the top wall 15 has suitably mounted thereon, for forward and rearward adjustment, a box suspending lug 16 of any suitable design to overlie the front of the cross arm B and to be engaged with the cross arm securing bolt 11 for the purpose of suspending the junction box from said bolt. Since the lug is forwardly and rearwardly adjustable relative to the junction box it is apparent that the back of the box may be disposed against the pole A when the lug 16 is disposed against the front of the cross arm B, regardless of the spacing of the front of the cross arm from the pole. Therefore, mounting of the present junction box in a firmly supported position, with its back against a pole and with its suspending lug overlying the front of a cross arm and engaged with the cross arm securing bolt, is greatly facilitated.

While a strong, sliding connection of any suitable type may be provided between the suspending lug 16 and the top wall 15 of the junction box, a simple and practical connection may comprise, as shown, a pair of laterally spaced flanges or ribs 17, 17 formed integral with and rising from the box top and each having a longitudinally extending channel 18 opening through its inner face, and a pair of ribs or flanges 19, 19, one at each side of the base portion 20 of the lug 16, disposed in said channels 18, 18 respectively. Moreover, while the lug 16 may be of any suitable design, it preferably comprises, as shown, a horizontal base portion 20 of any suitable length carrying the ribs or flanges 19, 19 at the sides thereof, and an upstanding or vertical portion 21 at the front end of said base portion 20 to overlie the front of a cross arm B. In the portion 21 is of course, a hole 22 to accommodate a cross arm securing bolt, and while this hole may be of any suitable size and shape, it preferably is of a size at its bottom to permit the head of the cross arm securing bolt to pass freely therethrough, and is of lesser size at its top than said bolt head, so that the lug is operatively engageable with the bolt, behind the head thereof, simply by alining the bottom portion of the hole 22 with the bolt head, by then moving the lug rearwardly until the bolt head is disposed forwardly of the lug, and by then lowering the lug. In this connection it will be understood, of course, that the cross arm securing bolt is backed outwardly sufficiently to accommodate the vertical portion of the lug 16 between its head and the front of the cross arm prior to application of the lug to said bolt, and that thereafter the bolt is tightened by means of a nut 23 on the rear end thereof to secure the lug against the cross arm and the latter against the pole. Preferably, but not necessarily, the vertical portion 21 of the lug is provided at its front with ribs 24 which serve not only to reinforce the lug, but to cooperate with the sides of the bolt head to prevent the bolt from turning. Obviously, the construction described provides for mounting of the lug 16 on a cross arm securing bolt without requiring removal of the bolt from the pole and the cross arm. Obviously, too, when the lug 16 is operatively mounted on a cross arm securing bolt, the junction box is securely suspended and is readily adjustable rearwardly until its rear wall is disposed against the pole carrying the cross arm. At the bottom of the box is a depending, apertured lug 25 through which a lag screw or other suitable fastener 26 is screwed into the pole to effect final, firm mounting of the box against the pole.

Extending vertically along each side wall 13 of the box adjacent to its front edge and preferably from bottom to top thereof is an outwardly directed rib 27, and extending across the top wall of the box, adjacent to its front edge and preferably from side to side of the box, is an upwardly directed rib 28 which is joined at its ends with the ribs 27.

The box door, designated as 29, is in the form of a flat plate of a width and height to cover the open front of the box C and is provided at its sides with flanges 30 that are directed first rearwardly and then inwardly to provide inwardly opening, vertically extending channels 31. Also, said door is provided at its top with a flange 32 that is directed first rearwardly and then downwardly to provide a downwardly opening channel 33, and, as shown the flange 32 extends entirely across the top of the door and is joined at its ends with the upper ends of the side flanges 30 whereby said flanges and the channels 31, 33 therein are continuous.

The door is assembled with the box by alining the open, lower ends of its side channels 31 with the tops of the ribs 27, 27 of the box and by then sliding the door downwardly to cause the ribs 27, 27 to enter the channels 31, 31. The door thus becomes interlocked with the box for vertical sliding movement between closed and open positions, and following its assembly with the box a screw or screws 34 is, or are, threaded therethrough at a suitable point, or points, near its bottom so that their inner projecting ends form stops for contact with the top wall of the box to prevent the door from being raised so far as to be removable from the box. Obviously, when the door is in its completely lowered or closed position the rib 28 at the top of the box is received within the channel 33 at the top of the door and is covered by the door top flange 32. Accordingly, when the door is closed, rain, snow and the like is effectively prevented from entering the box through the door opening therein, due to the cooperation of the rib 28 and the flange 32 at the top of the box and to the cooperation of the ribs 27 and the flanges 30 at the sides of the box.

Against the inner face of one or both of the side walls 13 of the box, near the top thereof, is pivotally mounted a latch plate 35 for cooperation with the lower edge of the door, when the door is raised to its open position, to hold it in its open position. The latch plate 35 is of elongated, substantially rectangular form and is pivoted, as at 36, rearwardly of its center of gravity so that it has a constant tendency to rotate forwardly. Moreover, it is positioned so that when the door is disposed in front of the same it is held by the door in an upright or inoperative position. At its upper, forward corner, said latch plate is notched as indicated at 37 to provide an upwardly facing shoulder 38 which is disposed below the top of said plate. Accordingly, when the door is raised until its lower edge is disposed above the shoulder 38, the latch plate rotates forwardly under the influence of gravity until its top portion engages the inner face of the door and its shoulder 38 is disposed beneath the lower edge of the door. This occurs just prior to the stop screws 34 contacting with the top wall of the box and prior to the lower edge of the door moving above the top of the latch plate, so that it is not possible to raise the door so far as to permit the latch plate to rotate forwardly beyond a latching position. Therefore, it is not necessary to exercise care in opening the door. On the contrary, it may be carelessly lifted to open position, and will be stopped when fully opened by the stop pins 34 and will be latched securely in its open position by the latch plate, or plates, 35. To release the door for closing of the same, all that is required is to press the latch plate, or plates, 35 rearwardly to disengage its, or their, shoulder, or shoulders, 36 from beneath the lower edge of the door, whereupon the latter is free to gravitate to its closed position.

As will be noted by reference to Fig. 2 of the drawings, the channels 18 of the flanges 17 and the ribs 19 of the lug 16 are disposed above the top of the box and the bottom of said lug respectively, by amounts which permit the lug to be operatively assembled with the box by sliding the lug rearwardly over the rib 28 at the top of the box prior to assembly of the door with the box. It will also be noted in this connection that when the door is in its closed position the flange 32 at the top thereof serves as a stop preventing the lug 16 from being disassembled from the box by forward movement of the lug, and that stops 39 are provided which prevent disassembly of said lug from the box by rearward movement of the lug. Accordingly, following assembly of the lug 16 with the box and subsequent assembly of the door with the box, said lug 16 is held effectively assembled with the box against the possibility of accidental loss therefrom.

Obviously, instead of the box being entirely open at its front, it may have a front wall with a door opening therein, in which event suitable ribs for cooperation with the channels at the sides and the top of the door may, of course, be provided on the front wall of the box.

Within the box are insulating blocks 40 which may be fastened, for example, to the rear wall of the box and which carry terminal posts 41 to which line or other wires may be connected. In the bottom and the side walls of the box are openings 42 through which wires may extend into and from the box, and covering the openings in the side walls of the box are hoods 42 whereby rain, snow and the like is prevented from entering the box through said side wall openings.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:

1. A line wire junction box comprising a box body having a rear wall, side walls, top and bottom walls and open at its front, outwardly directed ribs on the side walls adjacent to the front edges thereof extending vertically along said side walls, an upwardly directed rib on the top wall adjacent to the front edge thereof and joined at its ends to the tops of said side wall ribs, and a door having rearwardly directed side flanges provided with inwardly opening channels in which the side wall flanges are disposed whereby the door is mounted on the box body for vertical sliding movement between raised and lowered open and closed positions respectively, said door also having a rearwardly directed top flange joined at its ends with said side flanges and having a downwardly opening channel to receive the box top wall rib when the door is closed, stop means carried by the door for contact with the top wall of the box to limit opening movement of the door, and a box suspending lug slidably interfitted with a top portion of the box for forward and rearward movement relative to the box, and held by the door against disassembly from the box by forward sliding movement relative to the box.

2. A line wire junction box comprising a box body having a front doorway, a door slidably mounted on said body for vertical movement between raised and lowered open and closed positions, respectively, and removable from said body by upward sliding movement relative thereto, a box suspending lug slidably mounted on top of the body for forward and rearward movement relative thereto and forwardly removable from said body when the door is removed, said door, in all operative positions thereof having a portion thereof disposed in front of said lug to prevent removal of the same from the body.

3. A line wire junction box comprising a box body having a front doorway, a door slidably mounted on said body for vertical movement between raised and lowered open and closed positions, respectively, and removable from said box body by upward sliding movement relative thereto, a box suspending lug slidably mounted on top of said box body for forward and rearward movements relative thereto and forwardly removable from said box body when the door is removed, and stop means carried by the box body and preventing removal of said lug from said box body by rearward movement of the lug relative to the box body, said door, in all operative positions thereof, having a portion thereof disposed in front of said lug to prevent removal of said lug from said box body by forward sliding movement of said lug relative to said body.

WILSON HEATH STILWELL.